US010212672B2

United States Patent
Su et al.

(10) Patent No.: US 10,212,672 B2
(45) Date of Patent: Feb. 19, 2019

(54) CONTROLLING TRANSMISSION (71) Applicant: Nokia Solutions and Networks Oy, Espoo (FI)

(72) Inventors: Lei Su, Shenzhen (CN); Heikki Einari Sipola, Oulu (FI)

(73) Assignee: Nokia Solution and Networks Oy, Espoo (FI)

( * ) Notice: Subject to any disclaimer, the term of this patent is extended or adjusted under 35 U.S.C. 154(b) by 0 days.

(21) Appl. No.: 15/537,938

(22) PCT Filed: Dec. 22, 2014

(86) PCT No.: PCT/CN2014/094460
§ 371 (c)(1),
(2) Date: Jun. 20, 2017

(87) PCT Pub. No.: WO2016/101087
PCT Pub. Date: Jun. 30, 2016

(65) Prior Publication Data
US 2017/0353930 A1    Dec. 7, 2017

(51) Int. Cl.
*H04W 52/26*    (2009.01)
*H04W 52/30*    (2009.01)
*H04L 5/00*    (2006.01)
*H04W 52/36*    (2009.01)
*H04W 88/02*    (2009.01)

(52) U.S. Cl.
CPC ......... *H04W 52/262* (2013.01); *H04L 5/0057* (2013.01); *H04W 52/365* (2013.01); *H04W 88/02* (2013.01)

(58) Field of Classification Search
CPC . H04W 52/262; H04W 52/365; H04W 88/02; H04W 52/26; H04W 52/30; H04L 5/0057
USPC ....................................... 455/522, 69, 127.1
See application file for complete search history.

(56) References Cited

U.S. PATENT DOCUMENTS

| | | | |
|---|---|---|---|
| 2006/0281462 A1 | 12/2006 | Kim et al. | |
| 2010/0309793 A1* | 12/2010 | Choi | ..................... H04L 1/0016 370/252 |
| 2012/0263060 A1* | 10/2012 | Suzuki | ................ H04W 52/365 370/252 |

FOREIGN PATENT DOCUMENTS

| | | |
|---|---|---|
| CN | 102271389 A | 12/2011 |
| CN | 102291813 A | 12/2011 |
| CN | 103428838 A | 12/2013 |
| JP | 2012213209 A | 11/2012 |
| JP | 2014522194 A | 8/2014 |
| WO | WO 2013181444 A2 | 12/2013 |
| WO | WO 2013184492 A1 | 12/2013 |
| WO | WO 2014/020172 A1 | 2/2014 |

* cited by examiner

*Primary Examiner* — Dong-Chang Shiue
(74) *Attorney, Agent, or Firm* — Harrington & Smith (57) ABSTRACT

An apparatus and a method is disclosed. The solution includes determining a first parameter related to the transmission power available at a user terminal and determining at least one second parameter related to the quality of a connection of the user terminal. At least one threshold value is adjusted on the basis of the first parameter; and a selection of modulation and coding scheme for user terminal is performed by comparing the at least one second parameter to the at least one adjusted threshold value.

16 Claims, 5 Drawing Sheets

CONTROLLING TRANSMISSION

TECHNICAL FIELD

The exemplary and non-limiting embodiments of the invention relate generally to wireless communication systems.

BACKGROUND

Mobile communication systems are under constant development. New services are being introduced and the capacity which may be offered to users is increasing. Basic factors that need to be taken care of in the development of the present and future systems are quality of service offered to users and the available communication resources.

The quality of service (QoS) is measured using given parameters which may be system dependent. Usually a given QoS target is set for each connection. The quality of a communication link should fulfil the target criterion but not exceed it needlessly. In some systems, adaptive modulation and coding (AMC) is utilized to select the most appropriate modulation order and coding rate to be used on a connection at a given time on the radio link so that the target criterion is achieved and communication resources are used efficiently.

BRIEF DESCRIPTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus comprising: at least one processor; and at least one memory including computer program code, the at least one memory and the computer program code configured to, with the at least one processor, cause the apparatus at least to: determine a first parameter related to the transmission power available at a user terminal; determine at least one second parameter related to the quality of a connection of the user terminal; adjust at least one threshold value on the basis of the first parameter; and perform a selection of modulation and coding scheme for user terminal by comparing the at least one second parameter to the at least one adjusted threshold value.

According to an aspect of the present invention, there is provided an apparatus comprising: means for determining a first parameter related to the transmission power available at a user terminal; means for determining at least one second parameter related to the quality of a connection of the user terminal; means for adjusting at least one threshold value on the basis of the first parameter; and means for performing a selection of modulation and coding scheme for user terminal by comparing the at least one second parameter to at least one threshold value.

According to an aspect of the present invention, there is provided a method comprising: determining a first parameter related to the transmission power available at a user terminal; determining at least one second parameter related to the quality of a connection of the user terminal; adjusting at least one threshold value on the basis of the first parameter; and performing a selection of modulation and coding scheme for user terminal by comparing the at least one second parameter to the at least one adjusted threshold value.

According to an aspect of the present invention, there is provided a computer program product embodied on a distribution medium readable by a computer and comprising program instructions which, when loaded into an apparatus, execute a computer process comprising: determining a first parameter related to the transmission power available at a user terminal; determining at least one second parameter related to the quality of a connection of the user terminal; adjusting at least one threshold value on the basis of the first parameter; and performing a selection of modulation and coding scheme for user terminal by comparing the at least one second parameter to the at least one adjusted threshold value.

One or more examples of implementations are set forth in more detail in the accompanying drawings and the description below. Other features will be apparent from the description and drawings, and from the claims.

BRIEF DESCRIPTION OF DRAWINGS

In the following the invention will be described in greater detail by means of preferred embodiments with reference to the accompanying drawings, in which.

DETAILED DESCRIPTION OF SOME EMBODIMENTS

Embodiments are applicable to any base station, user terminal (UT), server, network element corresponding component, and/or to any communication system or any combination of different communication systems or networks that support required functionalities.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN or E-UTRAN), long term evolution (LTE, known also as E-UTRA), long term evolution advanced (LTE-A), Wireless Local Area Network (WLAN) based on IEEE 802.11 standard, worldwide interoperability for microwave access (Wi-MAX), Bluetooth®, personal communications services (PCS) and systems using ultra-wideband (UWB) technology. IEEE refers to the Institute of Electrical and Electronics Engineers.

Figure 1:
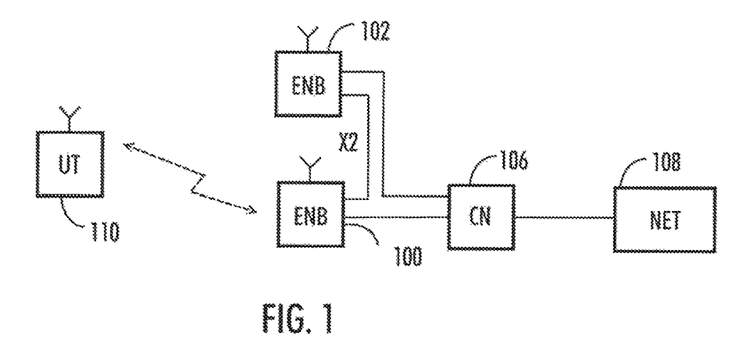
FIG. 1 illustrates an example of a communication environment.

FIG. 1 illustrates a simplified view of an example of a communication environment only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for communication are irrelevant to the actual invention. Therefore, they need not to be discussed in more detail here.

In the example of FIG. 1, a radio system based on long term evolution advanced (LTE Advanced, LTE-A) network elements is shown. However, the embodiments described in these examples are not limited to the LTE-A radio systems but can also be implemented in other radio systems and networks supporting required functionalities.

FIG. 1 shows an eNodeBs (eNBs) 100 and 102 connected to core network CN 106 of a communication system. The eNodeBs are connected to each other over an X2 interface.

The eNodeBs 100, 102 that may also be called base stations of the radio system may host the functions for Radio Resource Management: Radio Bearer Control, Radio Admission Control, Connection Mobility Control, Dynamic Resource Allocation (scheduling). Depending on the system, the counterpart on the CN side can be a serving gateway (S-GW, routing and forwarding user data packets), packet data network gateway (P-GW, for providing connectivity of user devices (UEs) to external packet data networks), and/or mobile management entity (MME), etc. The MME (not shown) is responsible for the overall user terminal control in mobility, session/call and state management with assistance of the eNodeBs through which the user terminals may connect to the network.

The communication system is also able to communicate with other networks, such as a public switched telephone network or the Internet (NET) 108. The communication network may also be able to support the usage of cloud services. It should be appreciated that eNodeBs or their functionalities may be implemented by using any node, host, server or access point etc. entity suitable for such a usage.

The user terminal UT (also called user device, user equipment (UE), terminal device, etc.) illustrates one type of an apparatus to which resources on the air interface may be allocated and assigned, and thus any feature described herein with a user device may be implemented with a corresponding apparatus, such as a relay node. An example of such a relay node is a layer 3 relay (self-backhauling relay) towards the base station.

The user terminal typically refers to a portable computing device that includes wireless mobile communication devices operating with or without a subscriber identification module (SIM), including, but not limited to, the following types of devices: a mobile station (mobile phone), smartphone, personal digital assistant (PDA), device using a wireless modem (alarm or measurement device, etc.), laptop and/or touch screen computer, tablet, phablet, game console, notebook, and multimedia device. A user terminal may also be a machine-type communications device, such as a sensor, actuator, processor or microcontroller capable to communicate via a radio interface. Additionally, a user terminal may also be a nearly exclusive uplink only device, of which an example is a camera or video camera loading images or video clips to a network. It can be also only a modem (or a chip) which may be a part of the mobile communication device.

The user terminal (or in some embodiments a layer 3 relay node) is configured to perform one or more of user equipment functionalities. The device may also be called a subscriber unit, mobile station, remote terminal, access terminal, user equipment (UE) just to mention but a few names or apparatuses.

Further, although the apparatuses have been depicted as single entities, different units, processors and/or memory units (not all shown in FIG. 1) may be implemented. For example, a communication network may be realized utilising a cloud based access network. In such a solution, eNodeBs may be realised with servers connected to a cloud network and remote radio nodes connected to the servers.

FIG. 1 shows a user terminal 110 communicating with the eNodeB 100.

In most communication systems, the network controls the uplink transmission of a user terminal. The network may perform link adaptation (LA) of the uplink transmission (i.e. user terminal transmission). In link adaptation, the network may select a suitable modulation and coding scheme for the user terminal utilising information received from the user terminal. In most cases, a given target criterion is set for each connection and link adaptation is used to achieve the target.

For example in LTE or LTE-A systems, for reaching a target criterion, such as a block error rate (BLER) of the uplink connection, adaptive modulation and coding (AMC) is used to select the appropriate modulation order and coding rate to be used at a given time on a radio link. The selection may be based on available channel information. The locally-optimum modulation and coding schemes (MCS) selection of uplink Link Adaptation (LA) is often referred to as Inner-Loop LA (ILLA) and Outer-Loop LA (OLLA) for uplink. For downlink, Outer Link Quality Control (OLQC) may be used.

In general, ILLA is used to estimate channel quality of the uplink channel based on measurements such as signal-to-interference ratio (SIR) of Sounding Reference Signal or signal-to-interference ratio (SIR) of Physical Uplink Shared Channel (PUSCH), for example. ILLA may be based on BLER measurements which are calculated based on the acknowledge/no-acknowledge (ACK/NACK) feedback obtained from Layer1/Layer2, and it is performed every time a given timer expires.

OLLA is used to correct any bias in the measurement (such as under or overestimate of the channel quality by ILLA) so that the target BLER can be kept. OLLA may be based on the first transmission ACK/NACK information provided by Layer1/Layer2 hybrid automatic repeat request (HARQ). OLLA provides a quicker adaptation to radio conditions compared to ILLA which typically will act every 100 to 500 ms defined by the given timer since it basically counts the BLER based on first transmissions. While ILLA is performed every time the timer expires, OLLA is event triggered. ILLA uses BLER thresholds for controlling MCS and OLLA control is based on $\Delta C$, which is the error in ILLA determined by OLLA.

For uplink, the target of the ILLA/OLLA is thus to maintain user terminal's BLER close to the established target BLER. In real systems, instantaneous BLER values include feedback delay, estimation errors, event latency, timer precision, and varying channel statistics. As a result, the BLER thresholds (for ILLA) or $\Delta C$ limits (for OLLA) need to be adapted to track and mitigate these imperfections.

One problem is that the BLER thresholds or $\Delta C$ limits utilised by ILLA and OLLA are set during connection set up. At present, they cannot be changed during the connection. Further issue of current MCS control is that MCS cannot be further adjusted while user terminal's BLER is within the range (for ILLA) or its channel quality somehow improve rapidly (for OLLA) after the thresholds/limits are determined.

Figure 2A:
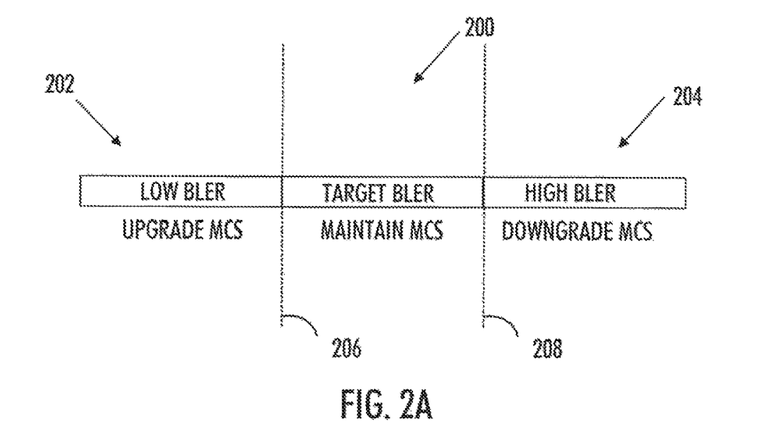
FIGS. 2A and 2B illustrate the operation of link adaptation.

FIGS. 2A and 2B illustrate the operation of ILLA and OLLA. FIG. 2A shows three BLER areas, Target BLER 200, Low BLER 202 and High BLER 204. Two BLER thresholds may be used, Low BLER threshold 206 and High BLER threshold 208. If BLER is below Low BLER Threshold, MCS is upgraded and if BLER is above High BLER Threshold, MCS is downgraded. While BLER stays within the thresholds in the Target BLER area, MCS is maintained as it is.

Figure 2B:
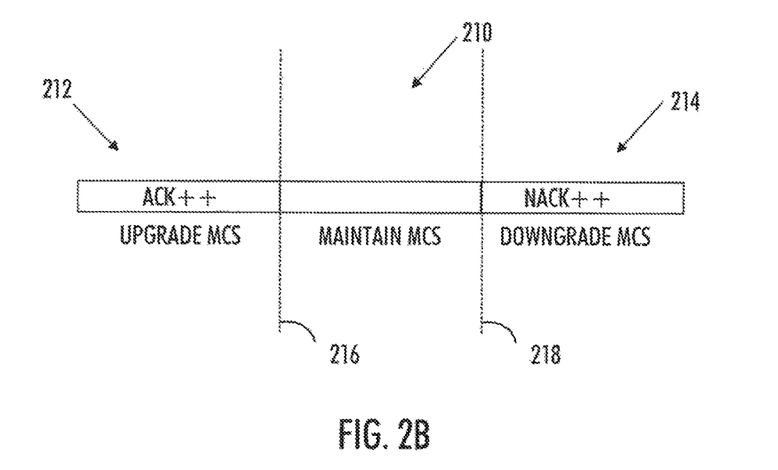

FIG. 2B shows three ΔC areas, Target BLER area 210, ACK increase area 212 and NACK increase area 214. Two ΔC thresholds may be used, higher limit of ΔC 216 and lower limit of ΔC 218. If ΔC is above higher limit 216, MCS is upgraded and if ΔC is below lower limit 218, MCS is downgraded.

For downlink, Outer Link Quality Control (OLQC) adapts the channel quality information that is used by packet scheduler and link adaptation to achieve target block error ratio (BLER) for the first transmission of a Transport Block. The CQI reports are derived from the downlink received signal quality, typically based on measurements of the downlink reference signals. For example, user terminals may be configured to measure reference symbols transmitted by an eNodeB and report CQI value corresponding to the MCS to the eNodeB. OLQC aims to compensate any non-idealities for the link adaptation such as: CQI estimation error because of user terminal using a signal to interference plus noise ration (SINR) range to estimate the CQI value. It is possible that UE reports same the CQI if the SINR doesn't reach lower limit or higher limit.

The user terminals may be configured to report to the network parameters related to the transmission power available at the user terminal. An example of such parameter is power headroom. Power headroom of a user terminal may be calculated as the difference between the maximum user terminal transmission power and the nominal transmit power used in Physical Uplink Shared Channel (PUSCH) in a subframe. If a user terminal has power headroom, it may be considered to have additional transmission power available.

In an embodiment, a higher MCS with considering target BLER may be selected for a user terminal in a time window when the user terminal UE has indicated that it has additional transmission power or power headroom.

Figure 3:
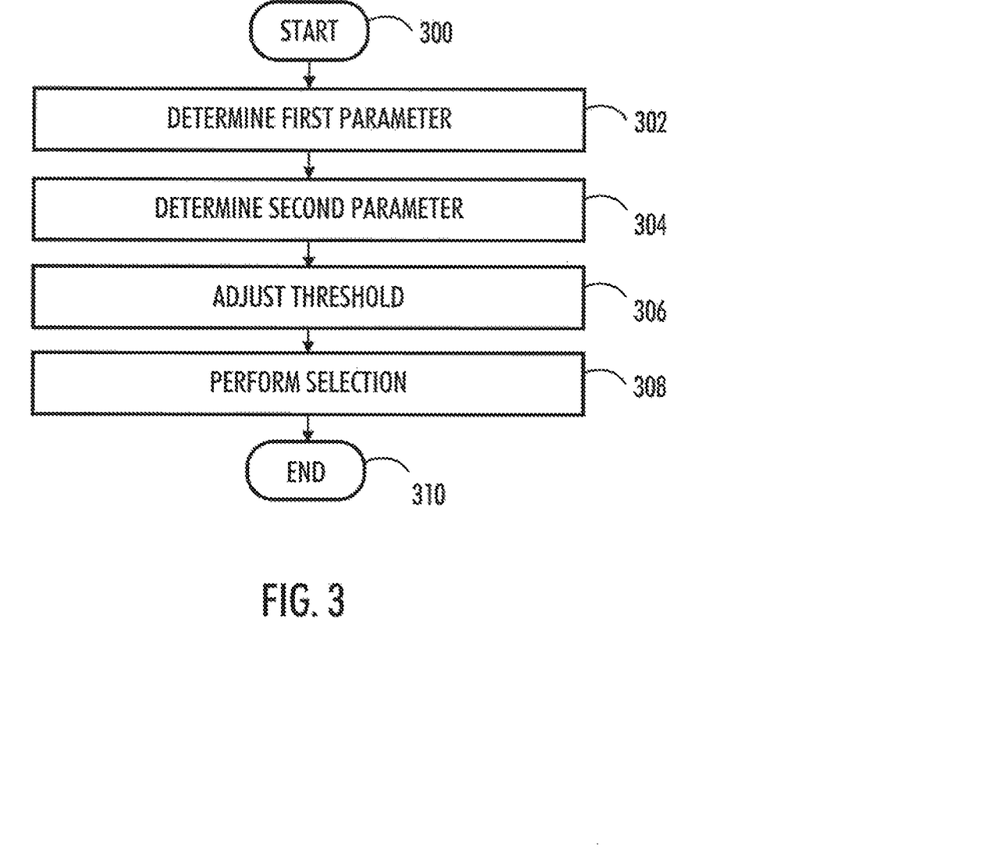
FIGS. 3, 4, 5 and 6 are flowcharts illustrating some embodiments.

FIG. 3 illustrates an example embodiment of the invention. The example illustrates the operation of the apparatus controlling the user terminal. In an embodiment, the apparatus is a network element of a communication system. The network element may be an eNodeB, or a base station, or a part of an eNodeB, or base station (e.g. a modem or a chip) or a relay node. The steps and related functions described are not in absolute chronological order, and some of the steps may be performed simultaneously or in an order differing from the given one. The example starts at 300.

In step 302, the apparatus is configured to determine a first parameter related to the transmission power available at a user terminal. In an example embodiment, the first parameter is the power headroom of the user terminal. Other respective parameters may also be used.

In step 304, the apparatus is configured to determine at least one second parameter related to the quality of a connection of the user terminal. In an embodiment, the second parameter is BLER. In another embodiment, the second parameter is ΔC.

In step 306, the apparatus is configured to adjust at least one threshold value on the basis of the first parameter.

In step 308, the apparatus is configured to perform a selection of modulation and coding scheme for user terminal by comparing the at least one second parameter to the at least one adjusted threshold value.

The example ends at 310.

In an embodiment, when the second parameter is BLER, the at least one threshold may comprise Low BLER threshold 206 and High BLER threshold 208.

In an embodiment, when the second parameter is ΔC, the at least one threshold may comprise higher limit of ΔC 216 and lower limit of ΔC 218.

In an embodiment, the apparatus performing the at least some of above steps is Medium Access Control Packet Scheduler of the apparatus (e.g. a base station or an eNodeB). The Packet Scheduler may be configured to execute a Medium Access Control Packet Scheduler Slow Adaptive Modulation and Coding Outer-Loop LA Adaptive Transmission Bandwidth (Slow AMC OLLA ATB) algorithm with MCS adjustment. In an LTE/LTE-A system, MCS adjustment may be performed when user terminal reports power headroom exceeding a given target Uplink Power Headroom (UPH) threshold, when higher MCS may be utilised.

In an embodiment, the Slow AMC OLLA ATB algorithm performs MCS selection with OLLA as first step. This is followed by MCS adjustment with ILLA if AMC switch period has expired.

In an embodiment, when it is detected that user terminal has reached a given target Uplink Power Headroom (UPH) threshold, a value for ΔC is determined in depending on the result of Cyclic Redundancy Check (CRC) (first HARQ feedback):

$$\Delta C(t) = \begin{cases} \min(\Delta C(t-1) + C_{stepup}, \Delta C_{max} - \mathit{Offset}_{max}), & \text{for first } HARQ \\ & \text{feedback} = ACK, \\ \max(\Delta C(t-1) - C_{stepdown}, \Delta C_{min} + \mathit{Offset}_{min}), & \text{for first } HARQ \\ & \text{feedback} = NACK, \\ \Delta C(t-1), & \text{for first } HARQ \\ & \text{feedback} = N/A. \end{cases}$$

where,

UPH threshold is typically set in the range: {0dB, 1 dB, 2 dB . . . 40 dB}. The UPH threshold may be received from the network contained by L3 signalling upon user connection setup. In one embodiment, the UPH threshold may be received by the apparatus (e.g. a base station) from the core network (e.g. network management node such as NetAct).

$\mathit{Offset}_{max} = \Delta \text{offset} * UPH / P_{max} * \Delta C_{max}$.

$\mathit{Offset}_{min} = \Delta \text{offset} * UPH / P_{max} * \Delta C_{min}$.

Δoffset is a parameter having a typical range: {0, 0.1, 0.2 . . . , 1}. The offset may be received by the apparatus (e.g. a base station) from the core network (e.g. network management node such as NetAct), for example, during connection setup.

UPH is uplink power headroom reported by the user terminal and carried by MAC control element.

$P_{max}$ is maximum allowable transmission power for the user terminal. It is an operator configurable parameter.

$\Delta C_{max}$ is maximum factor to allow MCS enhancement, i.e. higher limit of ΔC. It is an operator configurable parameter.

$\Delta C_{mm}$ is minimal factor to allow MCS reduction, i.e. lower limit of ΔC. It is an operator configurable parameter.

$C_{stepup}$ and $C_{stepdown}$ are incremental compensation steps sizes, which obey to the following formula:

$C_{stepdown} = C_{stepup} * (1 - \text{ulTargetBler}) / \text{ulTargetBler}$ ulTargetBler is target BLER for the uplink and it is an operator configurable parameter.

Figure 4:
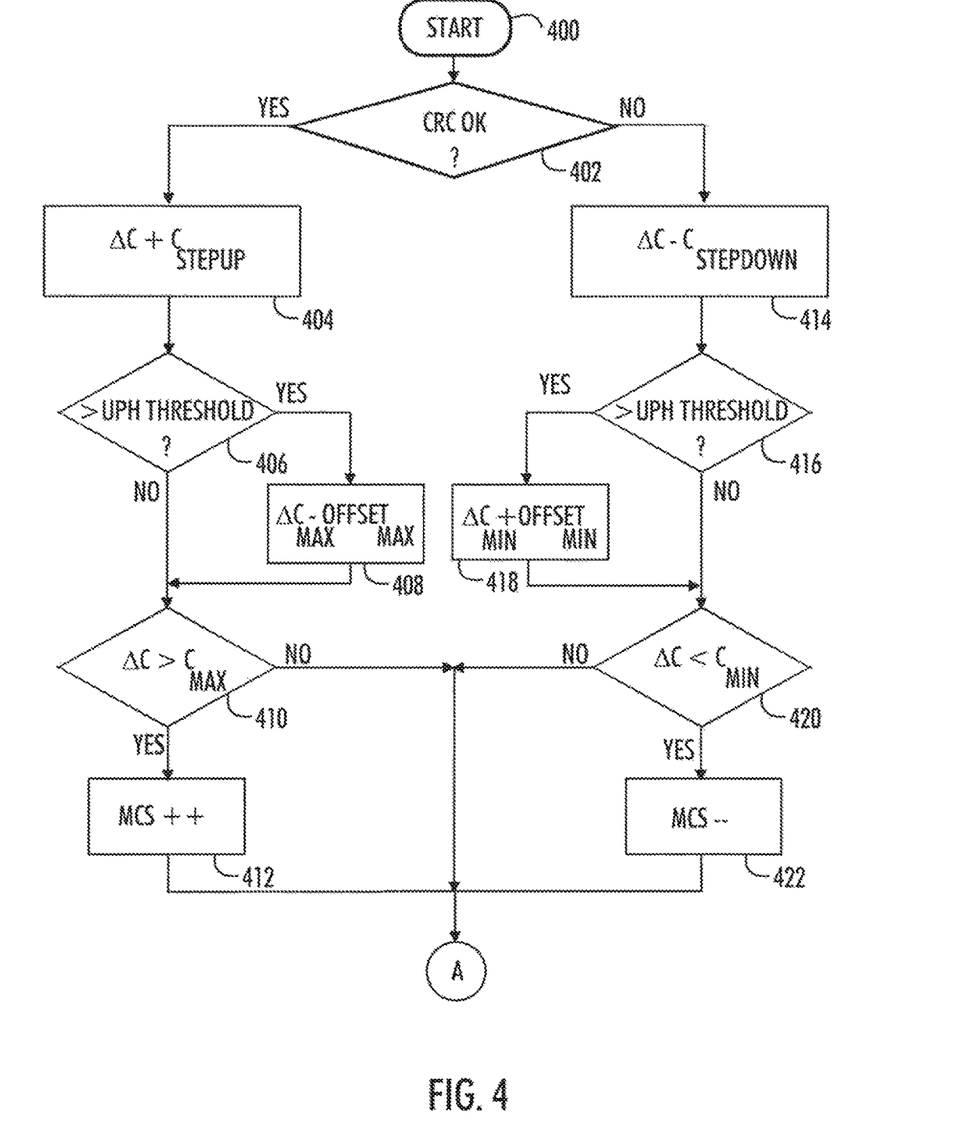

FIG. 4 is a flowchart illustrating an example of the operation of OLLA. The operation starts at 400. The result of Cyclic Redundancy Check (CRC) (first HARQ feedback) is examined in step 402. A value for ΔC is incremented or decremented in steps 404, 414 depending on the CRC result.

In steps 406, 416, the first parameter related to the transmission power is examined. In an embodiment, user terminal power headroom UPH is examined.

If power headroom is above given threshold, the thresholds (higher and lower limits of ΔC are adjusted with an offset value in steps 408, 418.

In steps 410, 420 ΔC is compared to the thresholds, and MCS is updated in steps 412, 422 if needed.

Figure 5:
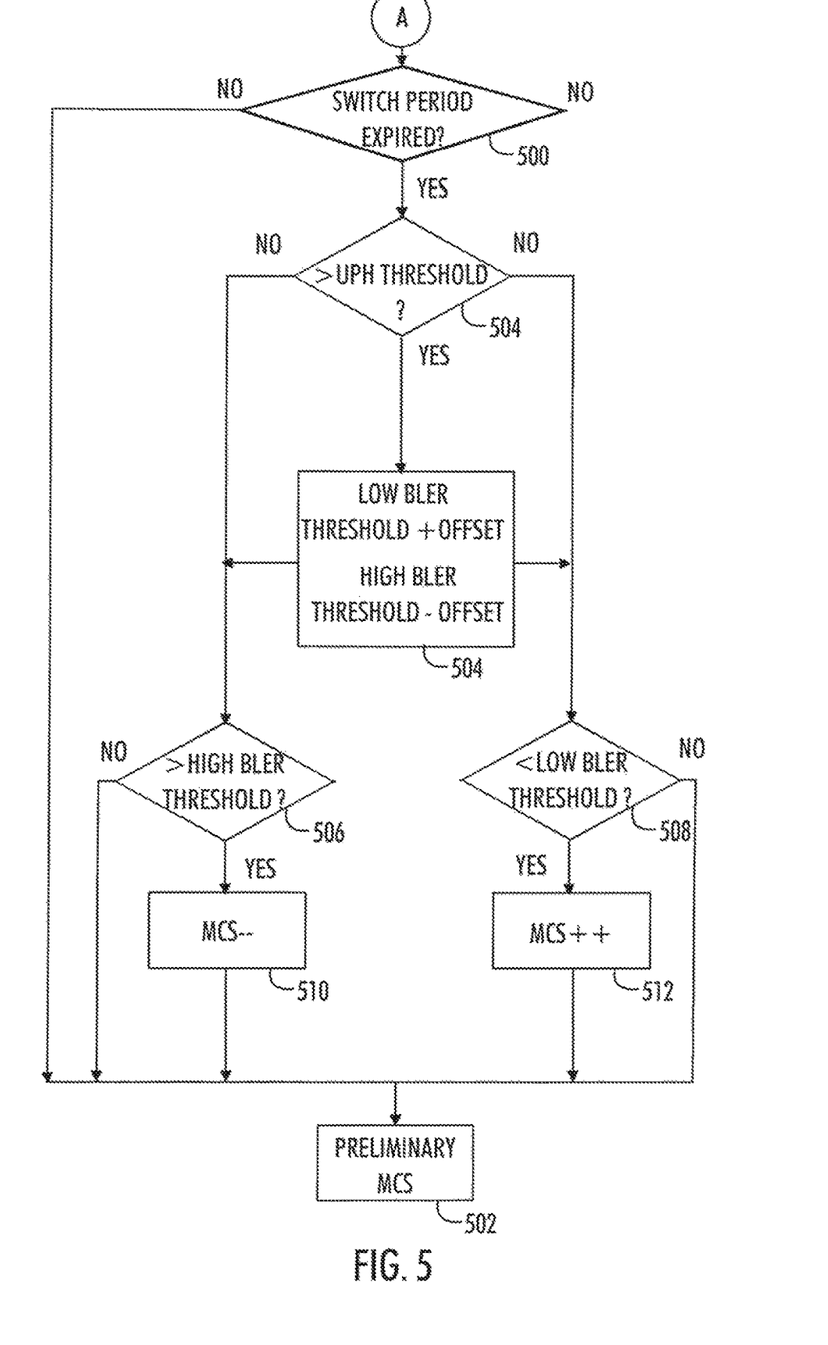

The operation continues in the flowchart of FIG. 5 which illustrates an example of the operation of ILLA. ILLA is executed if a given Adaptive Modulation and Coding switch period has expired. This is evaluated in step 500. If AMC switch period has not expired, no changes 502 to MCS are made.

If AMC switch period has expired, the existence of user terminal power headroom UPH is examined in step 504. If power headroom is below a given threshold, the process continues in steps 506 and 508.

If power headroom is above a given threshold, the thresholds (low and high BLER thresholds) are adjusted with an offset value in step 504:

High BLER Threshold(Downgrade)=Round
(ulTargetBler*ulamcUpdown*grF*)+Offset, and Low BLER Threshold(Upgrade)=Round(ulTarget-
Bler/ulamcUpdown*grF*)+Offset where, Offset=Δoffset*UPH/$P_{max}$*(High BLER Threshold−
Low BLER Threshold)

ulTargetBler is Target BLER for the uplink and it is an operator configurable parameter.

ulamcUpdowngrF is Upgrade/Downgrade Factor and it is an operator configurable parameter.

Δoffset is a parameter having a typical range: {0, 0.1, 0.2 . . . , 1}.

UPH is uplink power headroom reported by the user terminal and carried by MAC control element.

$P_{max}$ is the maximum allowable transmission power for the user terminal. It is an operator configurable parameter.

The process continues in steps 506 and 508, where BLER is compared to the thresholds, and MCS is updated in steps 510, 512 if needed.

As mentioned, some aspects of the invention may be applied also to downlink direction. An offset may be applied for downlink OLQC also when user terminal has reported specific value of uplink power headroom. For example, in a system, the responsible network element can estimate the SINR threshold corresponding to the user terminal reported CQI value and translate it to the target CQI threshold. In UMTS/LTE/LTE-A system, the responsible network element could use an offset to correct the user terminal reported CQI value to approach the target CQI threshold in order to get higher corrected CQI value and MCS. The system may be UMTS, LTE or LTE-A.

Figure 6:
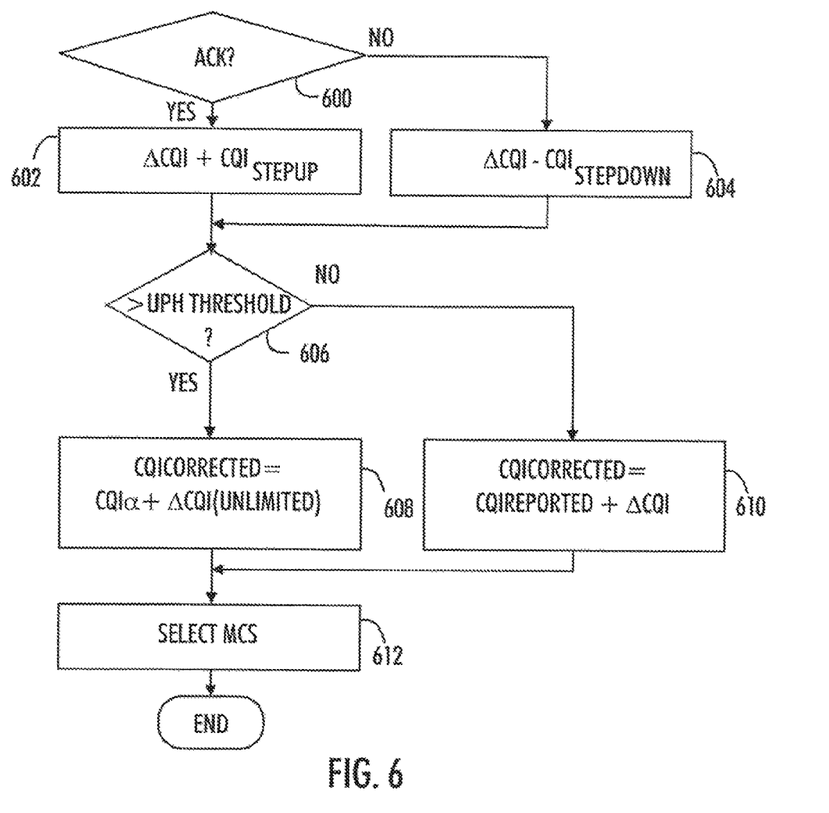

FIG. 6 is a flowchart illustrating an example embodiment of CQI adaptation in downlink direction. In this example, the operation depends 600 on first HARQ feedback (e.g. ACK/NACK/N/A), on the basis of which ΔCQI is either increased or decreased in steps 602, 604.

In step 606, the existence of user terminal power headroom is examined.

In an embodiment, if power headroom exists, a corrected CQI is calculated in step 608 utilising CQI☐ and ΔCQI unlimited. Otherwise a corrected CQI is calculated in step 610.

If power headroom exists, following applies:

$$\Delta CQI(t) = \begin{cases} \min(\Delta CQI(t-1) + CQI_{stepup}, \Delta CQI_{max}), & \text{for first HARQ feedback} = ACK \\ \max(\Delta CQI(t-1) - CQI_{stepdown}, \Delta CQI_{min}), & \text{for first HARQ feedback} = NACK, \\ \Delta CQI(t-1), & \text{for first HARQ feedback} = N/A. \end{cases}$$

Here, $\Delta CQI_{max}$ is the maximum CQI offset to allow MCS enhancement while CRC value is OK. It is an operator configurable parameter.

$\Delta CQI_{min}$ is the minimal CQI offset to allow MCS reduction while CRC in not OK. It is an operator configurable parameter.

$CQI_{stepup}$ and $CQI_{stepdown}$ are incremental compensation steps sizes, which may obey to the following formula:

$$CQI_{stepdown} = CQI_{stepup} * (1 - \text{ulTargetBler})/\text{ulTargetBler}$$

where ulTargetBler: Target BLER for the Downlink, operator configurable parameter.

In a system, the responsible network element may estimate the SINR threshold (EST) with UE reported CQI value according to prior art correspondence tables. The system may be UMTS, LTE or LTE-A Following is a non-limiting example of a table for reference:

| CQI index | modulation | code rate × 1024 | efficiency | Equivalent SINR Threshold |
|---|---|---|---|---|
| 1 | QPSK | 78 | 0.1523 | −6.71 |
| 2 | QPSK | 120 | 0.2344 | −5.11 |
| 3 | QPSK | 193 | 0.377 | −3.15 |
| 4 | QPSK | 308 | 0.6016 | −0.879 |
| 5 | QPSK | 449 | 0.877 | 0.701 |
| 6 | QPSK | 602 | 1.1758 | 2.529 |
| 7 | 16QAM | 378 | 1.4766 | 4.606 |
| 8 | 16QAM | 490 | 1.9141 | 6.431 |
| 9 | 16QAM | 616 | 2.4063 | 8.326 |
| 10 | 64QAM | 466 | 2.7305 | 10.3 |
| 11 | 64QAM | 567 | 3.3223 | 12.22 |
| 12 | 64QAM | 666 | 3.9023 | 14.01 |
| 13 | 64QAM | 772 | 4.5234 | 15.81 |
| 14 | 64QAM | 873 | 5.1152 | 17.68 |
| 15 | 64QAM | 948 | 5.5547 | 19.61 |

Next the responsible network element may be configured to calculate the target CQI threshold with the Equivalent SINR Threshold (EST). An example of calculation is as follows:

$$CQI_{target} = 0.51 * EST + 5.3$$

The formula depends on the system.

The CQI reported by the user terminal is replaced by $CQI_\alpha$ in CQI Adaptation.

$$CQI_\alpha = (CQI_{target} - CQI_{reported}) * \Delta \text{offset} + CQI_{reported}$$

If the reported user terminal power headroom is not larger than a given UPH threshold, following applies:

$$\Delta CQI(t) = \begin{cases} \Delta CQI(t-1) + CQI_{stepup}, & \text{for first } HARQ \\ & \text{feedback} = ACK, \\ \max(\Delta CQI(t-1) - CQI_{stepdown}, \Delta CQI_{min}), & \text{for first } HARQ \\ & \text{feedback} = NACK, \\ \Delta CQI(t-1), & \text{for first } HARQ \\ & \text{feedback} = N/A. \end{cases}$$

Finally in step 608, MCS selected on the basis of the corrected CQI according to correspondence with the CQI and MCS values.

Figure 7:
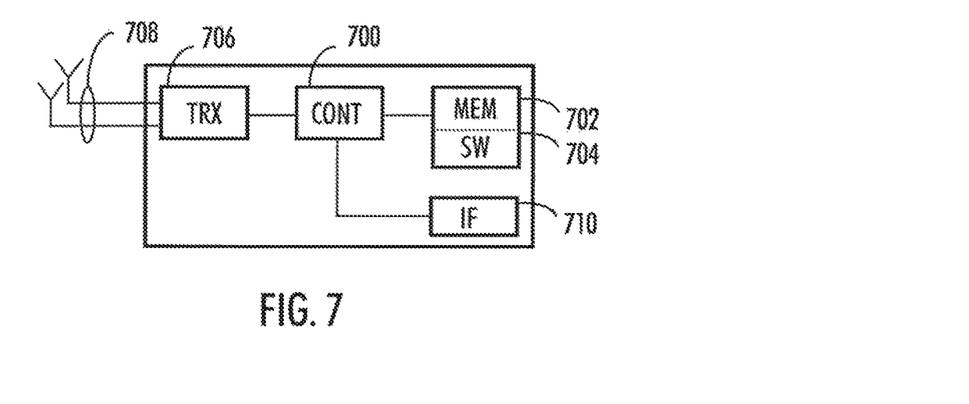
FIGS. 7 and 8 illustrate simplified examples of an apparatus in which some embodiments of the invention may be applied.

FIG. 7 illustrates a simplified example of an apparatus in which some embodiments of the invention may be applied. In some embodiments, the device may be a base station or eNodeB or a part of a base station or an eNodeB communicating with user terminals.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus may comprise a control circuitry (CONT) 700 configured to control at least part of the operation of the apparatus.

The apparatus may comprise a memory (MEM) 702 for storing data. Furthermore the memory may store software (SW or PROG) 704 executable by the control circuitry 700. The memory may be integrated in the control circuitry.

The apparatus comprises a transceiver (TRX) 706. The transceiver is operationally connected to the control circuitry 700. It may be connected to an antenna arrangement 708 comprising one more antenna elements or antennas.

The software 704 may comprise a computer program comprising program code means adapted to cause the control circuitry 700 of the apparatus to control a transceiver 706.

The apparatus may further comprise an interface (IF) 710 operationally connected to the control circuitry 700. The interface may connect the apparatus to other apparatuses such as a base station (e.e. an eNodeB) via X2 interface or to the core network (e.g. a network management system). The operator of the network may control the apparatus for example using the network management system. The apparatus may receive values for configurable or operational parameters such as the offset (defined by the operator) from the network management system.

The control circuitry 700 is configured to execute one or more applications. The applications may be stored in the memory 702. The applications may cause the apparatus to perform the embodiments described above.

Figure 8:
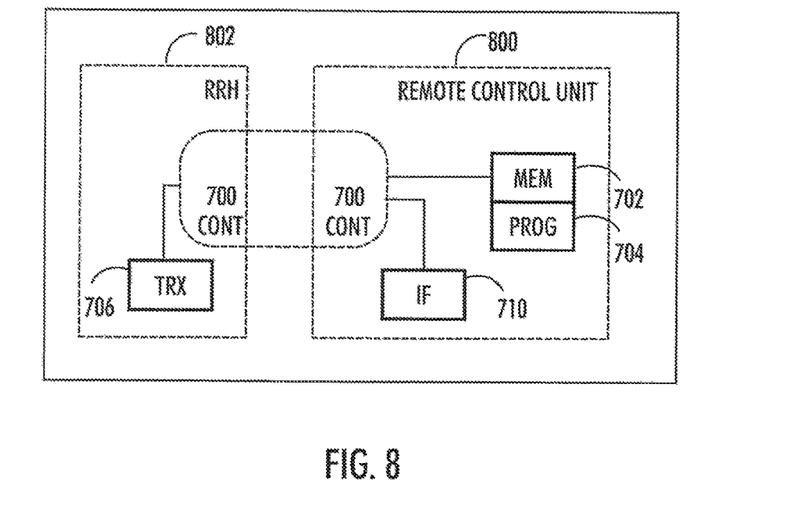

In an embodiment, as shown in FIG. 8, at least some of the functionalities of the apparatus of FIG. 8 may be shared between two physically separate devices, forming one operational entity. Therefore, the apparatus may be seen to depict the operational entity comprising one or more physically separate devices for executing at least some of the described processes. Thus, the apparatus of FIG. 8, utilizing such shared architecture, may comprise a remote control unit RCU 800, such as a host computer or a server computer, operatively coupled (e.g. via a wireless or wired network) to a remote radio head RRH 802 located in the base station. In an embodiment, at least some of the described processes may be performed by the RCU 800. In an embodiment, the execution of at least some of the described processes may be shared among the RRH 802 and the RCU 800.

In an embodiment, the RCU 800 may generate a virtual network through which the RCU 800 communicates with the RRH 802. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, or a circuitry which may comprise a working memory (RAM), a central processing unit (CPU), and a system clock. The CPU may comprise a set of registers, an arithmetic logic unit, and a controller. The controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The computer program may be run by the controller of a base station or an eNodeB as a part of a packet scheduler, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising:
    at least one processor; and
    at least one memory including computer program code, the at least one memory and the computer program code configured, with the at least one processor, to cause the apparatus at least to:
    determine a first parameter related to the transmission power available at a user terminal;
    determine at least one second parameter related to the quality of a connection of the user terminal;
    adjust at least one threshold value on the basis of the first parameter; and
    perform a selection of a modulation and coding scheme for the user terminal by comparing the at least one second parameter to the at least one adjusted threshold value,
    wherein the at least one memory and the computer program code are further configured, with the at least one processor, to cause the apparatus to:
    determine an offset value on the basis of the first parameter;
    adjust the value of at least one threshold value using the offset value;
    determine a block error rate of an uplink connection of the user terminal;
    compare the block error rate to at least one block error rate threshold;
    perform the selection of the modulation and coding scheme for the user terminal on the basis of the comparison;
    determine error in the selection of the modulation and coding scheme based on the block error rate;
    compare the error to at least one error threshold; and
    perform the selection of the modulation and coding scheme for the user terminal on the basis of the comparison.

2. The apparatus of claim 1, wherein the first parameter is a power headroom of the user terminal.

3. The apparatus of claim 2, wherein the at least one memory and the computer program code are further configured, with the at least one processor, to cause the apparatus to:
    determine a third parameter related to the quality of a connection of the user terminal; correct the third parameter on the basis of the first parameter; and perform a selection of the modulation and coding scheme for user terminal downlink connection on the basis of the corrected third parameter.

4. The apparatus of claim 3, wherein the third parameter is Channel Quality Index.

5. The apparatus of claim 3, wherein the at least one memory and the computer program code are further configured, with the at least one processor, to cause the apparatus to:
    receive a channel quality index from the user terminal;
    receive information on the power headroom of the user terminal;
    determine a signal-to-interference-plus-noise ratio on the basis of the received channel quality index;
    determine a first channel quality index correction parameter on the basis of the power headroom;
    determine a target channel quality index on the basis of the determined signal-to-interference-plus-noise ratio;
    determine a second channel quality index correction parameter on the basis of the target channel quality index and the received channel quality index;
    determine a corrected channel quality index by adding the second channel quality index correction and the first channel quality index correction parameter; and
    select the modulation and coding scheme for user terminal downlink connection on the basis of the corrected channel quality index.

6. The apparatus of claim 1, wherein the at least one block error rate threshold comprises a lower block error rate threshold and an upper block error rate threshold, and wherein the at least one memory and the computer program code are further configured, with the at least one processor, to cause the apparatus to:
    increase the lower block error rate threshold and the upper block error rate threshold with the offset value;
    compare the block error rate to the lower block error rate threshold and the upper block error rate threshold;
    upgrade the modulation and coding scheme when the block error rate is smaller than the lower block error rate threshold; and downgrade the modulation and coding scheme when the block error rate is larger than the upper block error rate threshold.

7. The apparatus of claim 1, wherein the at least one error threshold comprises a lower error threshold and an upper error threshold, and wherein the at least one memory and the computer program code are further configured, with the at least one processor, to cause the apparatus to:
increase the lower error threshold and the upper error threshold with the offset value;
compare the error to the lower error threshold and the upper error threshold;
upgrade the modulation and coding scheme when the error is smaller than the lower error threshold; and
downgrade the modulation and coding scheme when the error is larger than the upper error threshold.

8. The apparatus of claim 1, wherein the at least one memory and the computer program code are further configured, with the at least one processor, to cause the apparatus to:
receive from a network element one or more parameters for determining the offset value.

9. A method comprising:
determining a first parameter related to the transmission power available at a user terminal;
determining at least one second parameter related to the quality of a connection of the user terminal;
adjusting at least one threshold value on the basis of the first parameter; and
performing a selection of a modulation and coding scheme for the user terminal by comparing the at least one second parameter to the at least one adjusted threshold value,
wherein the method further comprises:
determining an offset value on the basis of the first parameter;
adjusting the value of at least one threshold value using the offset value;
determining a block error rate of an uplink connection of the user terminal;
comparing the block error rate to at least one block error rate threshold;
performing the selection of the modulation and coding scheme for the user terminal on the basis of the comparison;
determining error in the selection of the modulation and coding scheme based on the block error rate;
comparing the error to at least one error threshold; and
performing the selection of the modulation and coding scheme for the user terminal on the basis of the comparison.

10. The apparatus of claim 9, wherein the first parameter is a power headroom of the user terminal.

11. The method of claim 10, further comprising:
determining a third parameter related to the quality of a connection of the user terminal; correcting the third parameter on the basis of the first parameter; and
performing a selection of the modulation and coding scheme for user terminal downlink connection on the basis of the corrected third parameter.

12. The method of claim 11, wherein the third parameter is Channel Quality Index.

13. The method of claim 11, further comprising:
receiving a channel quality index from the user terminal;
receiving information on the power headroom of the user terminal;
determining a signal-to-interference-plus-noise ratio on the basis of the received channel quality index;
determining a first channel quality index correction parameter on the basis of the power headroom;
determining a target channel quality index on the basis of the determined signal-to-interference-plus-noise ratio;
determining a second channel quality index correction parameter on the basis of the target channel quality index and the received channel quality index;
determining a corrected channel quality index by adding the second channel quality index correction and the first channel quality index correction parameter; and
selecting the modulation and coding scheme for user terminal downlink connection on the basis of the corrected channel quality index.

14. The method of claim 9, wherein the at least one block error rate threshold comprises a lower block error rate threshold and an upper block error rate threshold, the method further comprising:
increasing the lower block error rate threshold and the upper block error rate threshold with the offset value;
comparing the block error rate to the lower block error rate threshold and the upper block error rate threshold;
upgrading the modulation and coding scheme when the block error rate is smaller than the lower block error rate threshold; and
downgrading the modulation and coding scheme when the block error rate is larger than the upper block error rate threshold.

15. The method of claim 9, wherein the at least one error threshold comprises a lower error threshold and an upper error threshold, the method further comprising:
increasing the lower error threshold and the upper error threshold with the offset value;
comparing the error to the lower error threshold and the upper error threshold;
upgrading the modulation and coding scheme when the error is smaller than the lower error threshold; and
downgrading the modulation and coding scheme when the error is larger than the upper error threshold.

16. The method of claim 9, further comprising:
receiving from a network element one or more parameters for determining the offset value.

* * * * *

UNITED STATES PATENT AND TRADEMARK OFFICE
CERTIFICATE OF CORRECTION

PATENT NO. : 10,212,672 B2
APPLICATION NO. : 15/537938
DATED : February 19, 2019
INVENTOR(S) : Lei Su and Heikki Einari Sipola It is certified that error appears in the above-identified patent and that said Letters Patent is hereby corrected as shown below:

In the Claims

In Claim 10:
Column 13, Line 52, "apparatus" should be deleted and --method-- should be inserted.

Signed and Sealed this
Sixteenth Day of April, 2019

Andrei Iancu
*Director of the United States Patent and Trademark Office*